(12) United States Patent
Zhang et al.

(10) Patent No.: US 11,966,722 B2
(45) Date of Patent: Apr. 23, 2024

(54) APPLICATION DEVELOPMENT SYSTEM INCLUDING A DYNAMIC MOCK ENGINE FOR SERVICE SIMULATION

(71) Applicant: Express Scripts Strategic Development, Inc., St. Louis, MO (US)

(72) Inventors: Li Zhang, Chesterfield, MO (US); Steven DeLassus, O'Fallon, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 71 days.

(21) Appl. No.: 17/725,951

(22) Filed: Apr. 21, 2022

(65) Prior Publication Data
US 2023/0342119 A1 Oct. 26, 2023

(51) Int. Cl.
G06F 8/38 (2018.01)
G06F 8/36 (2018.01)
G06F 9/54 (2006.01)

(52) U.S. Cl.
CPC .................. G06F 8/38 (2013.01); G06F 8/36 (2013.01); G06F 9/547 (2013.01)

(58) Field of Classification Search
CPC ............... G06F 8/38; G06F 8/36; G06F 9/547
USPC ........................................................ 715/762
See application file for complete search history.

(56) References Cited

U.S. PATENT DOCUMENTS

| | | | |
|---|---|---|---|
| 7,337,129 B1 * | 2/2008 | Lowry | G06Q 10/10 705/37 |
| 7,688,016 B2 | 3/2010 | Aghili | |
| 8,851,896 B2 | 10/2014 | Wallace | |
| 8,935,573 B2 | 1/2015 | Horsman | |
| 9,160,762 B2 | 10/2015 | Brake | |
| 9,396,091 B2 | 7/2016 | Bally | |
| 9,870,311 B2 | 1/2018 | Clark | |
| 10,027,627 B2 | 7/2018 | Parla | |
| 10,298,582 B2 | 5/2019 | Syomichev | |
| 10,542,006 B2 | 1/2020 | Chien | |
| 10,592,402 B2 | 3/2020 | Reeve | |

(Continued)

OTHER PUBLICATIONS

Walls, Spring Boot in Action, published 2015, pp. 1-266 (Year: 2015).*

*Primary Examiner* — Shahid K Khan
*Assistant Examiner* — Ahamed I Nazar
(74) *Attorney, Agent, or Firm* — Harness IP

(57) ABSTRACT

A computer system includes memory hardware configured to store a dynamic mock engine module for service simulation in a user interface application development system, and multiple mock configurations. Processor hardware is configured to execute instructions including receiving an endpoint name associated with an endpoint of a user interface, receiving an input request, and selecting at least one of the mock configurations that corresponds to the received endpoint name. For each of the selected mock configurations corresponding to the endpoint, the instructions include determining a number of field values in the mock request of the selected mock configuration that match a field value of the input request. The instructions include determining which one of the selected mock configurations has a greatest match with the received input request, and transmitting the output response of the mock configuration having the greatest match to a computing device of the user interface application development system.

20 Claims, 11 Drawing Sheets

(56) References Cited

U.S. PATENT DOCUMENTS

| | | |
|---|---|---|
| 10,803,029 B2 | 10/2020 | Holm |
| 10,949,335 B2 | 3/2021 | Battaglia |
| 10,963,370 B2 | 3/2021 | Battaglia |
| 10,999,376 B2* | 5/2021 | Jain ................ H04L 43/55 |
| 2002/0091534 A1 | 7/2002 | Berning |
| 2004/0243338 A1 | 12/2004 | Sabiers |
| 2010/0199227 A1 | 8/2010 | Xiao |
| 2010/0277468 A1 | 11/2010 | Lefevre |
| 2011/0010645 A1 | 1/2011 | Mihalcea |
| 2012/0151433 A1 | 6/2012 | Amodio |
| 2013/0145351 A1* | 6/2013 | Tunik ................ G06F 9/451 |
| | | 717/135 |
| 2013/0283238 A1 | 10/2013 | Levi |
| 2015/0100946 A1 | 4/2015 | Brunswig |
| 2017/0168676 A1 | 6/2017 | Calder |
| 2018/0060220 A1* | 3/2018 | Yao ................ G06F 11/36 |
| 2018/0365140 A1* | 12/2018 | Bates ................ G06F 9/451 |
| 2019/0235843 A1* | 8/2019 | Wu ................ G06F 8/35 |
| 2020/0233787 A1* | 7/2020 | Battaglia ............ H04L 63/0876 |
| 2020/0233790 A1* | 7/2020 | Battaglia ............ H04L 67/02 |

* cited by examiner

APPLICATION DEVELOPMENT SYSTEM INCLUDING A DYNAMIC MOCK ENGINE FOR SERVICE SIMULATION

FIELD

The present disclosure relates to an application development system including a dynamic mock engine for service simulation.

BACKGROUND

User interface (UI) components of many web and mobile applications rely on front end services to supply needed data. In order to develop UI components for all of the UI flows and handlings, a UI development team needs many different kinds of responses from services. For example, the UI development team may need different data such as various numbers of records (e.g., from zero up to many), data having different values, sizes and formats, etc. The UI development team may need responses for various service call statuses, such as 2xx, 3xx, 4xx, 5xx, etc. The UI development team may also need to deal with response time and network issues. For applications with large services ecosystems, it is very difficult to create all of the responses needed via real service layers and databases.

In some cases, static mock may be built into a UI component itself, instead of coming from a front end service. Other approaches may include using a service virtualization tool, or dedicated services which supply static mock data to support the mocking needs. However, these approaches have several shortcomings such as application programming interface (API) specification divergence, and mock data lacking dynamic behavior.

With API specification divergence, the mock data is provided by different sources than the real services. When the real service has an API specification change, the mock data will be out of sync with the real service. In that situation, the system administrator may be required to update mock data that is located in a different project. When the mock data lacks dynamic behavior, existing mock solutions can only supply static responses for the same endpoints. However, each UI component may need various responses in order to verify all of the flows and scenarios associated with the UI component.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store computer-executable instructions, a dynamic mock engine module for service simulation in a user interface application development system, and multiple mock configurations, wherein each mock configuration corresponds to a user interface endpoint and defines one or more fields of a mock request and an output response. The system includes processor hardware configured to execute the instructions, wherein the instructions include receiving an endpoint name associated with an endpoint of a user interface, receiving an input request having one or more fields and one or more values associated with each field, and selecting at least one of the mock configurations that corresponds to the endpoint of the user interface associated with the received endpoint name. For each of the selected mock configurations corresponding to the endpoint, the instructions include comparing fields of the mock request of the selected mock configuration to fields of the received input request, and determining a number of field values in the mock request of the selected mock configuration that match a field value of the input request. The instructions include determining which one of the selected mock configurations has a greatest match with the received input request according to the number of matching field values for each mock configuration, accessing the output response of the mock configuration having the greatest match with the received input request, and transmitting the output response to at least one computing device of the user interface application development system.

In other features, determining a number of field values in the mock request that match a field value of the input request includes setting a match count parameter to zero, and for each field value in the mock request, searching for a field value in the received input request that matches the field value of the mock request, and in response to identifying a matching field value in the received input request, incrementing the match count parameter. The instructions include assigning a value of the match count parameter as the determined number of matching field values for the mock request.

In other features, the instructions further include determining whether the received input request includes a session identifier, and in response to the received input request including a session identifier, obtaining at least one response value associated with the session identifier, and including the at least one response value in the output response transmitted to the at least one computing device. In other features, the instructions further include determining whether the received input request includes a current state identifier, and in response to the received input request including a current state identifier, identifying a current mock state value according to the current state identifier, determining a next mock value based on the current mock state value and the received input request, and assigning the next mock state value to a cookie element associated with the received input request.

In other features, the instructions further include, in response to receiving a transactional API call, storing a mockstate cookie value as the current state identifier. In other features, the dynamic mock engine module includes a mock exception factory that stores a mapping between exception types and runtime exceptions, and the instructions further include receiving an exception identifier associated with the received input request, determining a runtime exception according to the exception identifier and the mapping stored by the mock exception factory, and throwing a customized exception according to the determined runtime exception.

In other features, the mock configuration having the greatest match with the received input request includes a specified delay period, and transmitting the output response includes transmitting the output response only after the specified delay period has expired. In other features, receiving the input request includes receiving the input request via a representational state transfer (REST) application programming interface (API) controller.

In other features, the instructions further include receiving an API specification associated with another non-mock service, and assigning the received API specification for use by the dynamic mock engine module such that the dynamic mock engine module uses the same API specification as the other non-mock service. In other features, the instructions include receiving a development profile associated with another non-mock service, and assigning a different development profile for use by the dynamic mock engine module such that the dynamic mock engine module and the other non-mock service use different development profiles having different uniform resource locator (URL) addresses.

A computerized method for service simulation using a dynamic mock engine includes receiving an endpoint name associated with an endpoint of a user interface, receiving an input request having one or more fields and one or more values associated with each field, and selecting at least one of multiple mock configurations that corresponds to the endpoint of the user interface associated with the received endpoint name, wherein each mock configuration corresponds to a user interface endpoint and defines one or more fields of a mock request and an output response. For each of the selected mock configurations corresponding to the endpoint, the method includes comparing fields of the mock request of the selected mock configuration to fields of the received input request, and determining a number of field values in the mock request of the selected mock configuration that match a field value of the input request. The method includes determining which one of the selected mock configurations has a greatest match with the received input request according to the number of matching field values for each mock configuration, accessing the output response of the mock configuration having the greatest match with the received input request, and transmitting the output response to at least one computing device of a user interface application development system.

In other features, determining a number of field values in the mock request that match a field value of the input request includes setting a match count parameter to zero, and for each field value in the mock request, searching for a field value in the received input request that matches the field value of the mock request, and in response to identifying a matching field value in the received input request, incrementing the match count parameter. The instructions include assigning a value of the match count parameter as the determined number of matching field values for the mock request.

In other features, the method includes determining whether the received input request includes a session identifier, and in response to the received input request including a session identifier, obtaining at least one response value associated with the session identifier, and including the at least one response value in the output response transmitted to the at least one computing device. In other features, the method includes determining whether the received input request includes a current state identifier, and in response to the received input request including a current state identifier, identifying a current mock state value according to the current state identifier, determining a next mock value based on the current mock state value and the received input request, and assigning the next mock state value to a cookie element associated with the received input request.

In other features, the method includes, in response to receiving a transactional API call, storing a mockstate cookie value as the current state identifier. In other features, the method includes storing, by a mock exception factory, a mapping between exception types and runtime exceptions, receiving an exception identifier associated with the received input request, determining a runtime exception according to the exception identifier and the mapping stored by the mock exception factory, and throwing a customized exception according to the determined runtime exception.

In other features, the mock configuration having the greatest match with the received input request includes a specified delay period, and transmitting the output response includes transmitting the output response only after the specified delay period has expired. In other features, receiving the input request includes receiving the input request via a representational state transfer (REST) application programming interface (API) controller.

In other features, the method includes receiving an API specification associated with another non-mock service, and assigning the received API specification for use by a dynamic mock engine module such that the dynamic mock engine module uses the same API specification as the other non-mock service. In other features, the method includes receiving a development profile associated with another non-mock service, and assigning a different development profile for use by the dynamic mock engine module such that the dynamic mock engine module and the other non-mock service use different development profiles having different uniform resource locator (URL) addresses.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
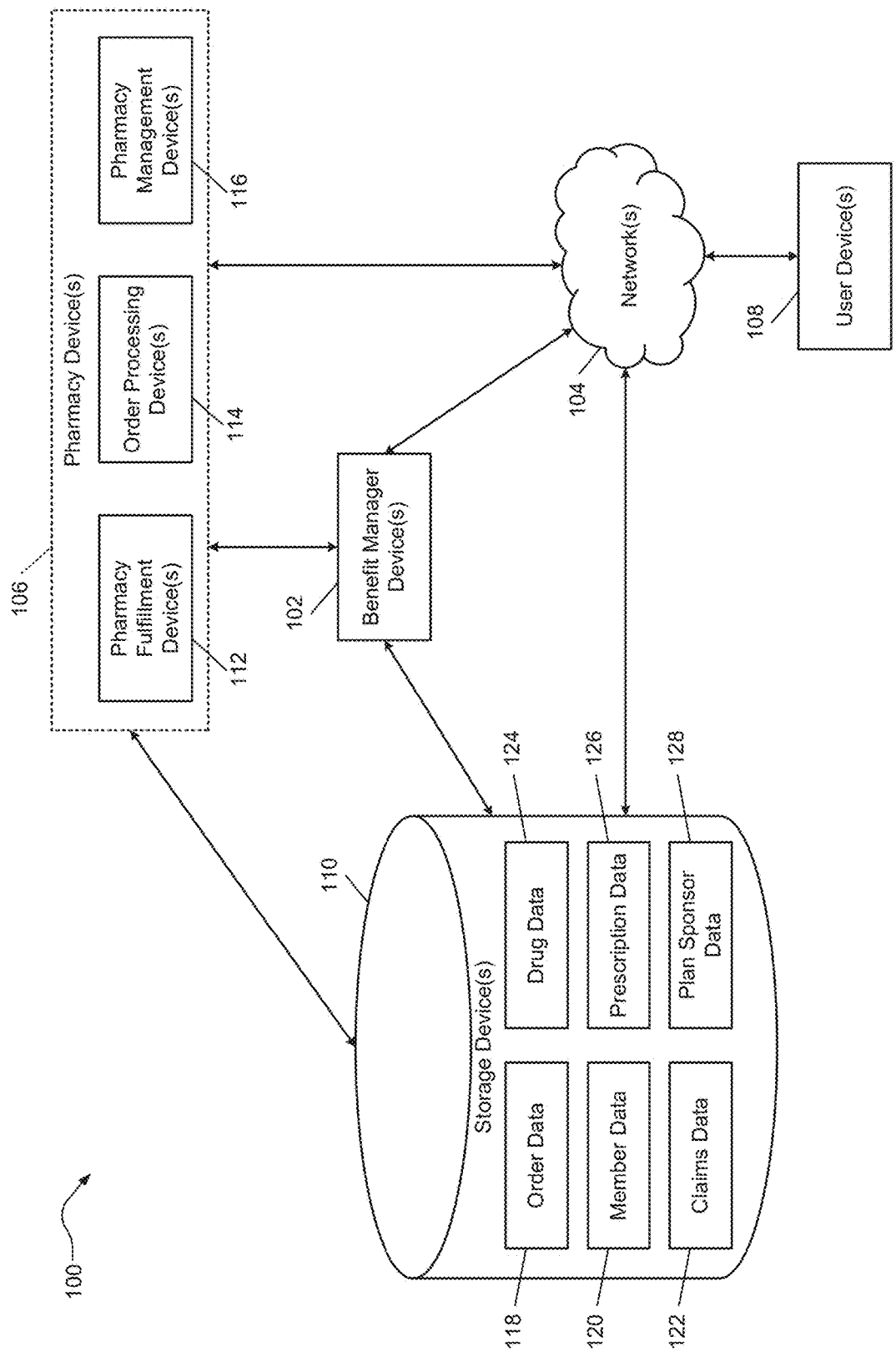
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
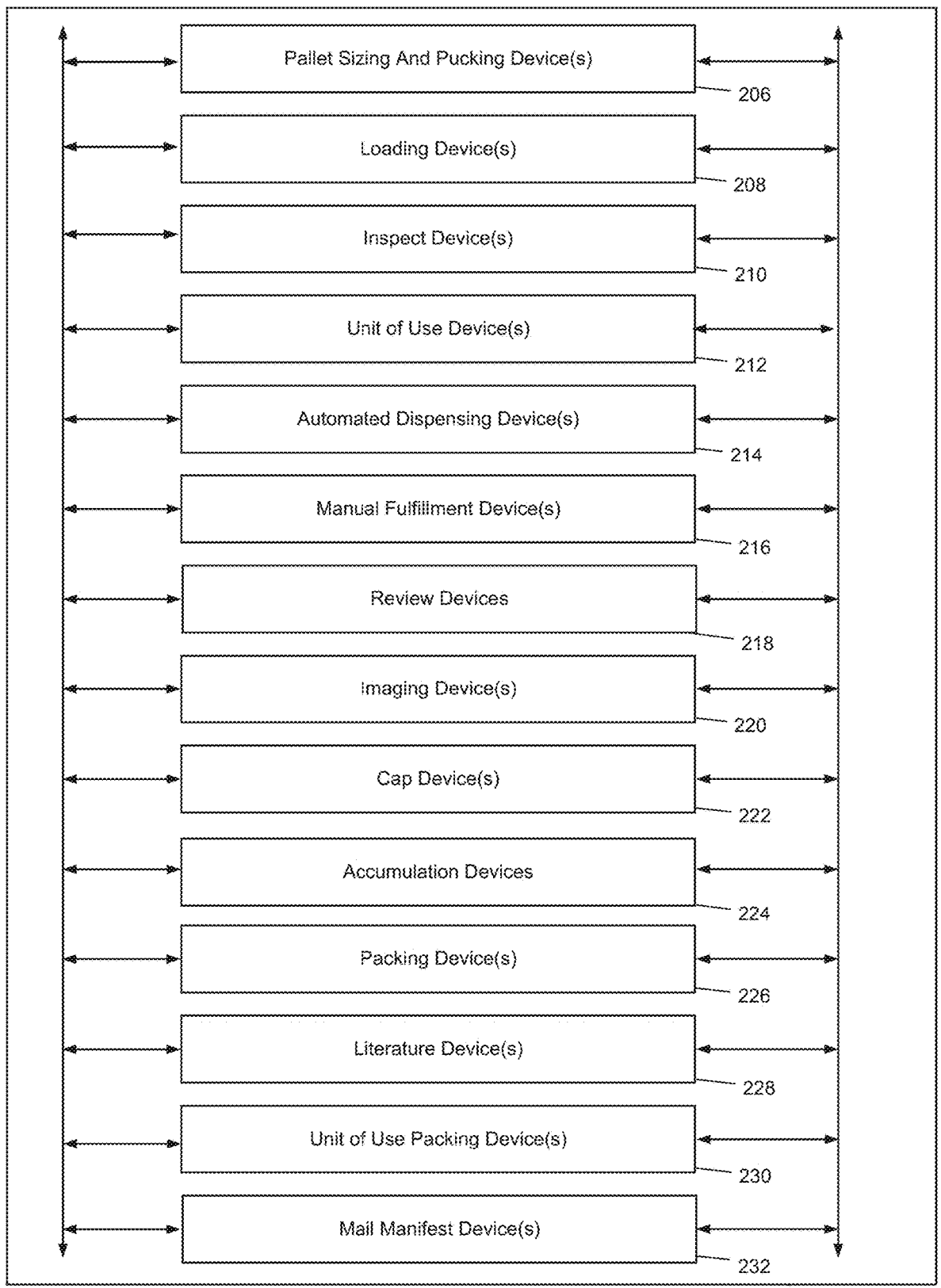
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
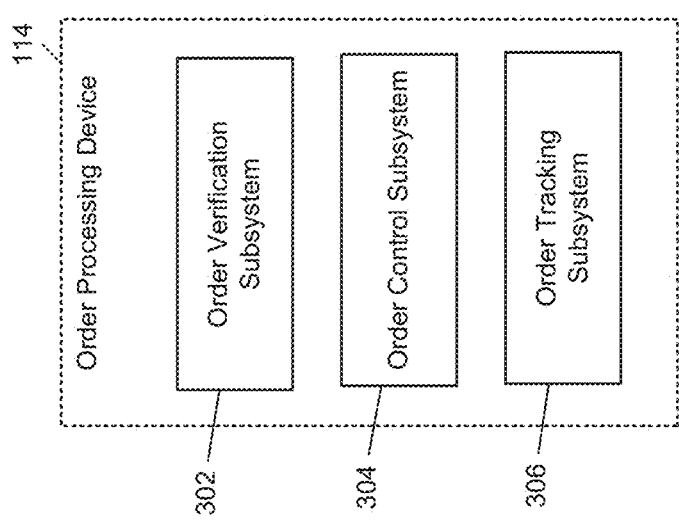
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Dynamic Mock Engine System

In various implementations described herein, a mock service may be built together with a real service to assist developers of UI components for applications, such as web and mobile applications. For example, the mock service may use the same service project as the real service, may use the same API specification as the real service, and may use a different profile (e.g., a different Spring profile) than the real service.

A dynamic mock engine may be built that is totally data driven. For example, the mock behaviors of the dynamic mock engine may be completely controlled by configuration data. The dynamic mock engine may include session awareness, where different user sessions have different behaviors. In various implementations, the dynamic mock engine may include state awareness, where different states of a same user session have different behaviors. The dynamic mock engine may generate different responses based on different request input parameters, may simulate response times via artificial delays, may simulate various exceptions, etc.

Figure 4:
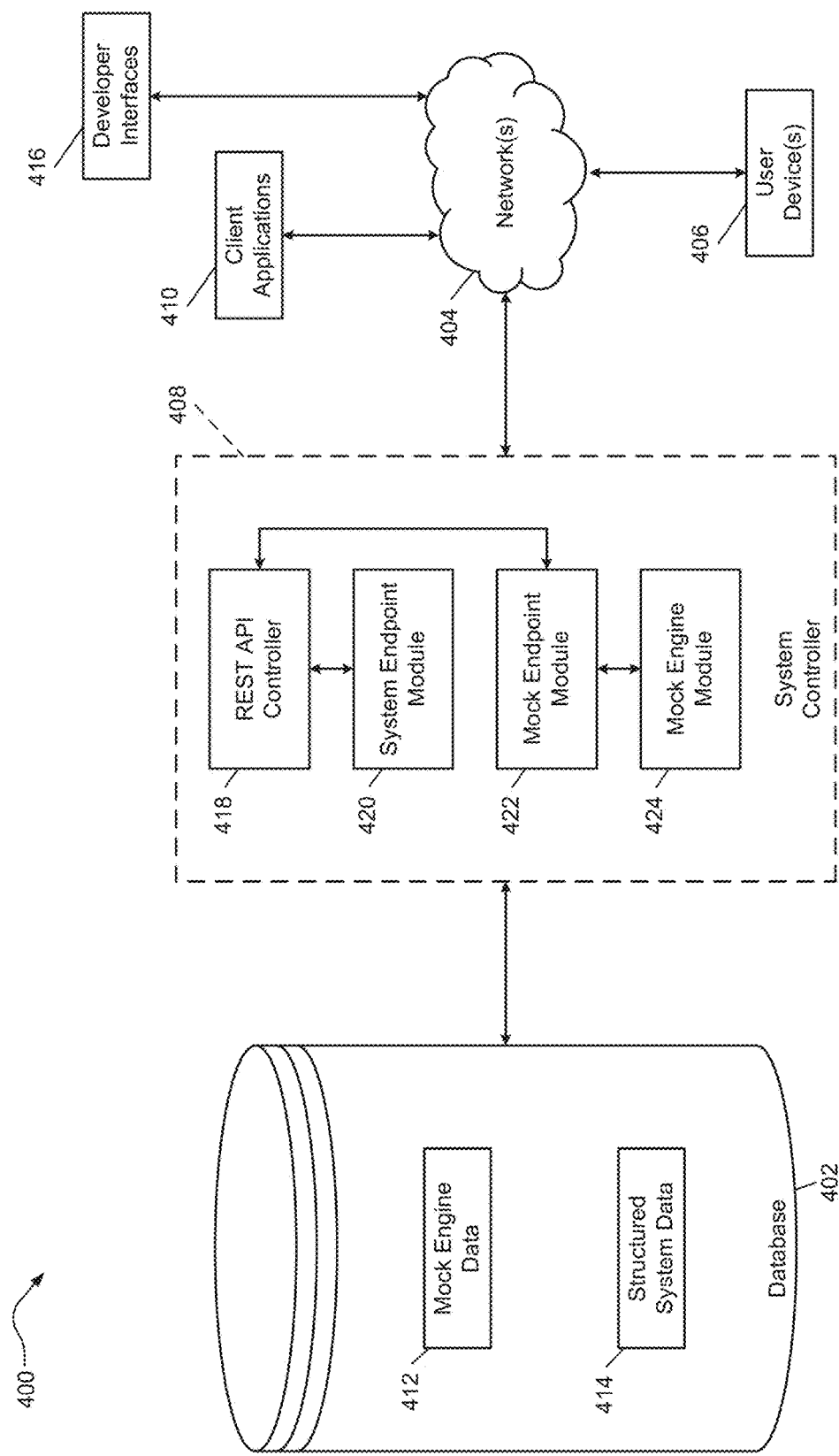
FIG. 4 is a functional block diagram of an example application development system including a dynamic mock engine for service simulation.

FIG. 4 is a functional block diagram of an example system 400 for application development using a dynamic mock engine for service simulation, where the system 400 includes a database 402. The database 402 may broadly refer to any suitable storage mechanism, such as a file system, a Git repository, etc. While the system 400 is generally described as being deployed in a computer network system, the database 402 and/or components of the system 400 may otherwise be deployed (for example, as a standalone computer setup). The system 400 may include a desktop computer, a laptop computer, cloud storage and processing, a sever, a tablet, a smartphone, etc.

As shown in FIG. 4, the database 402 stores mock engine data 412, and structured system data 414. In various implementations, the database 402 may store other types of data as well. The mock engine data 412 and structured system data 414 may be located in different physical memories within the database 402, such as a non-volatile hard disk or flash memory, different instances of databases, different collections, different tables, etc. In some implementations, the mock engine data 412 and structured system data 414 may be located in the same memory (such as in different address ranges of the same memory). In various implementations, the mock engine data 412 and structured system data 414 may each be stored as structured or unstructured data in any suitable type of data store.

The mock engine data 412 may include any suitable data that describes the configuration of a mock engine (such as the mock engine module 424) for handling simulated service request during UI development for an application. The mock engine data 412 may include data regarding processes for matching input requests to mock requests, processes for managing session awareness and state awareness, processes for handling exceptions, etc.

The mock engine data 412 may include any suitable data that may be used by a mock service implementation, such as one or more data sources that are accessed by a mock endpoint implementation (e.g., the mock endpoint module 422). The mock engine module 424 may access the mock engine data 412 in response to a call from an API controller such as the REST API controller 418 of FIG. 4. In various implementations, the mock engine data may include Java code, or computer-executable instructions in other suitable programming languages.

The structured system data 414 may include any suitable data that may be used by a real service implementation, such as one or more data sources that are used by a front end service project. For example, the structured system data 414 may include system data that is accessed by a real endpoint implementation such as the system endpoint module 420, which may occur in response to a call from an API controller such as the representational state transfer (REST) API controller 418 of FIG. 4.

A UI developer may define, update, manage, etc. the mock engine data 412 to produce desired responses when the mock engine module 424 is accessed by UI developers. For example, the system administrator may specify one or more mock configurations in the mock engine data 412 such that the mock engine module 424 provides a similar response as if a developer were making a call to the structured system data 414.

As shown in FIG. 4, a system controller 408 interfaces between the database 402 and client applications 410, developer interfaces 416 and user device(s) 406. The system controller 408 may include one or more modules for implementing application development, including a dynamic mock engine for service simulation. For example, FIG. 4 illustrates a REST API controller 418, a system endpoint module 420, a mock endpoint module 422, and a mock engine module 424.

The REST API controller 418 may be used to make API calls via the system endpoint module 420 and the mock endpoint module 422. In various implementations, the system endpoint module 420 and the mock engine module 424 use the same API specification, so the mock endpoint module 422 can track the system endpoint module 420 if changes are made to the API specification of the system endpoint module 420. Any change in the API may be implemented by both the system endpoint module 420 and the mock endpoint module 422. The system endpoint module 420 may access the structured system data 414 to provide responses, and the mock endpoint module 422 may access the mock engine data 412 to provide responses.

In various implementations, the mock endpoint module 422 may use the mock engine module 424 to provide responses. For example, the mock engine module 424 may be configured to operate based on the mock engine data 412, and may process the mock engine data 412 to provide responses based on calls using the REST API controller 418. The mock engine data 412 may include one or more mock configurations that may be used by the mock engine module 424 to match input requests, handle session awareness parameters, handle state awareness parameters, process exceptions, etc.

In various implementations, UI developers may access the system controller during development of application via the developer interfaces 416 and/or user devices 406. For example, the user devices 406 and/or developer interfaces 416 may access the mock endpoint module 422 while developing UI components, to use mock services. The client applications 410 may access the system controller 408, for example, to obtain system data using the system endpoint module 420.

The user device 406 may include any suitable user device for displaying text and receiving input from a user, including a desktop computer, a laptop computer, a tablet, a smartphone, etc. In various implementations, the user device 406 may access the system controller 408 directly, or may access the system controller 408 through one or more networks 404. Example networks may include a wireless network, a local area network (LAN), the Internet, a cellular network, etc.

The client applications 410 and developer interfaces 416 may include any suitable computing devices, such as a server, desktop computer, a laptop computer, a tablet, a smartphone, etc. In various implementations, the client applications 410 and developer interfaces 416 may access the system controller 408 directly, or may access the system controller 408 through the one or more networks 404.

Figure 5:
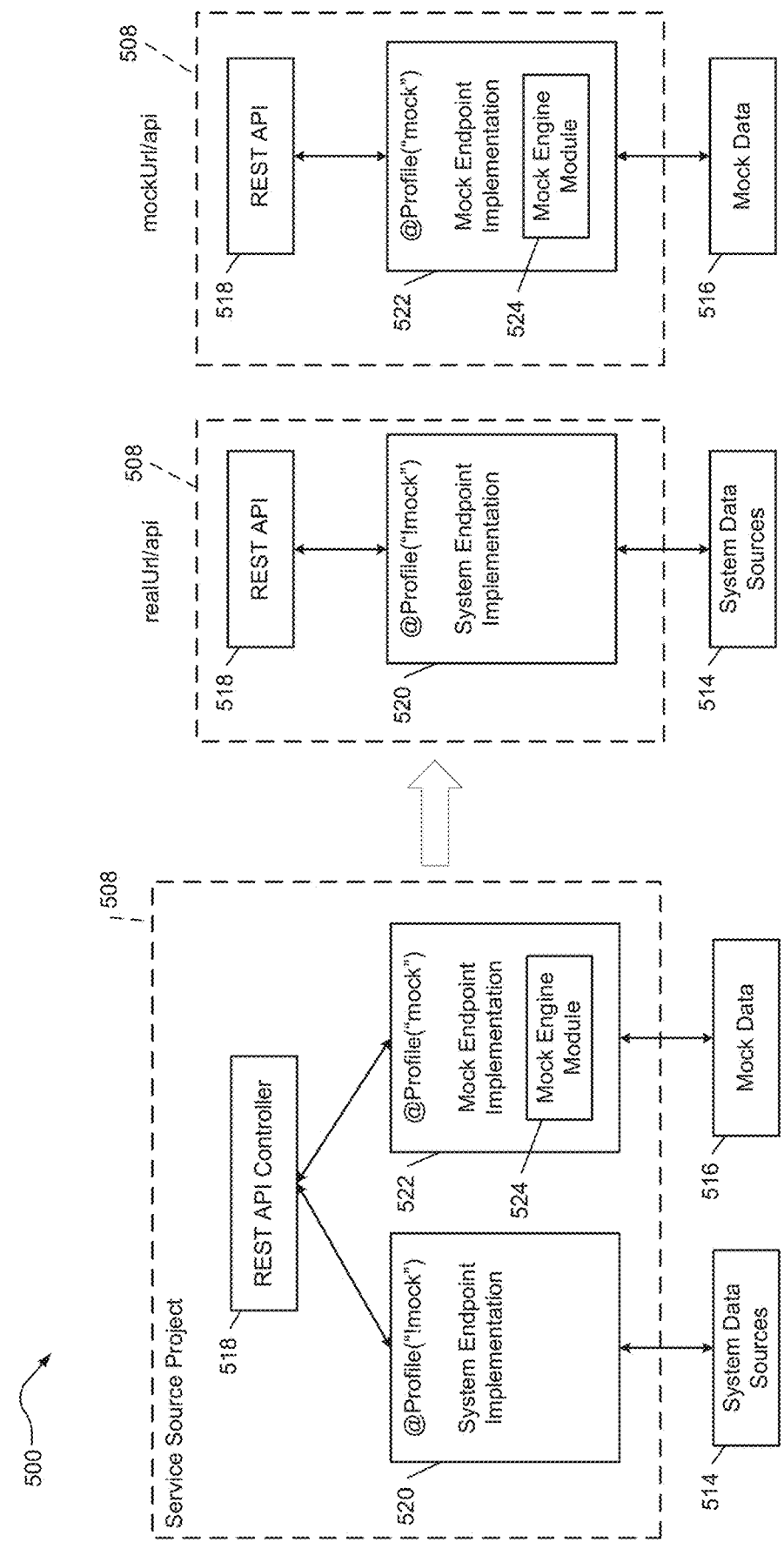
FIG. 5 is a functional block diagram illustrating an example architecture for two deployed services using the system of FIG. 4.

FIG. 5 illustrates an example architecture 500 for two deployed services using the system 400. As shown in FIG. 5, a Spring profile may be used to control two different implementations within a same service source project 508. For example, a real system endpoint implementation 520 and a mock endpoint implementation 522 may be deployed as two different service applications using different Spring profiles.

The example of FIG. 5 illustrates a Spring profile "!mock" that uses the system endpoint implementation 520 to access system data sources 514. The Spring profile "mock" uses the mock endpoint implementation 522 and the mock engine module 524 to access the mock data 516.

In various implementations, each implementation may use the same definition of the API layer, but use the separate Spring profiles "mock" and "!mock" for two different implementations for a service layer. Therefore, a same REST API controller 518 may be used with each endpoint implementation. For example, a common API controller layer may be used with the same API layer. Therefore, whether the mock service or real service is wired in depends on which Spring profile is used. Example pseudocode for the common API controller layer is produced below:

```
@Controller
@Path("/api")
public interface Resource {
    @GET
    Profile getProfile( );
}
@Component
public class ResourceImpl implements
Resource {
    private Service;
    @Autowired
    public ResourceImpl(Service service) {
        this service = service;
    }
    pubilc Profile getProfile( ) {
        service.getProfile( );
    }
}
```

The two service implementations may use different beans for the non-mock profile and the mock profile. Example pseudocode for the service beans is provided below:

```
//service beans for non-mock profile
@Profile("!mock")
@Configuration
public class Configuration {
    @Bean
    public Service service( ) {
        // real service implementation
        return new ServiceImpl( );
    }
}
// service beans for mock profile
@Profile("mock")
@Configuration
public class MockConfiguration {
    @Bean
    public Service service( ) {
        // mock service
        return new MockServiceImpl(mockEngine( ));
    }
}
```

In various implementations, two deployments may be based on a Spring profile. Below is example pseudocode for a manifest for cloud deployment, where two applications are deployed with a different Spring profile:

```
env:
    spring.application.name: myapplication
applications:
    name: myapplication-api-1
    env:
        spring.profiles.active: service
    name: myapplicationmock-api-1
    env:
        spring.profiles.active: service, mock
```

Figure 6:
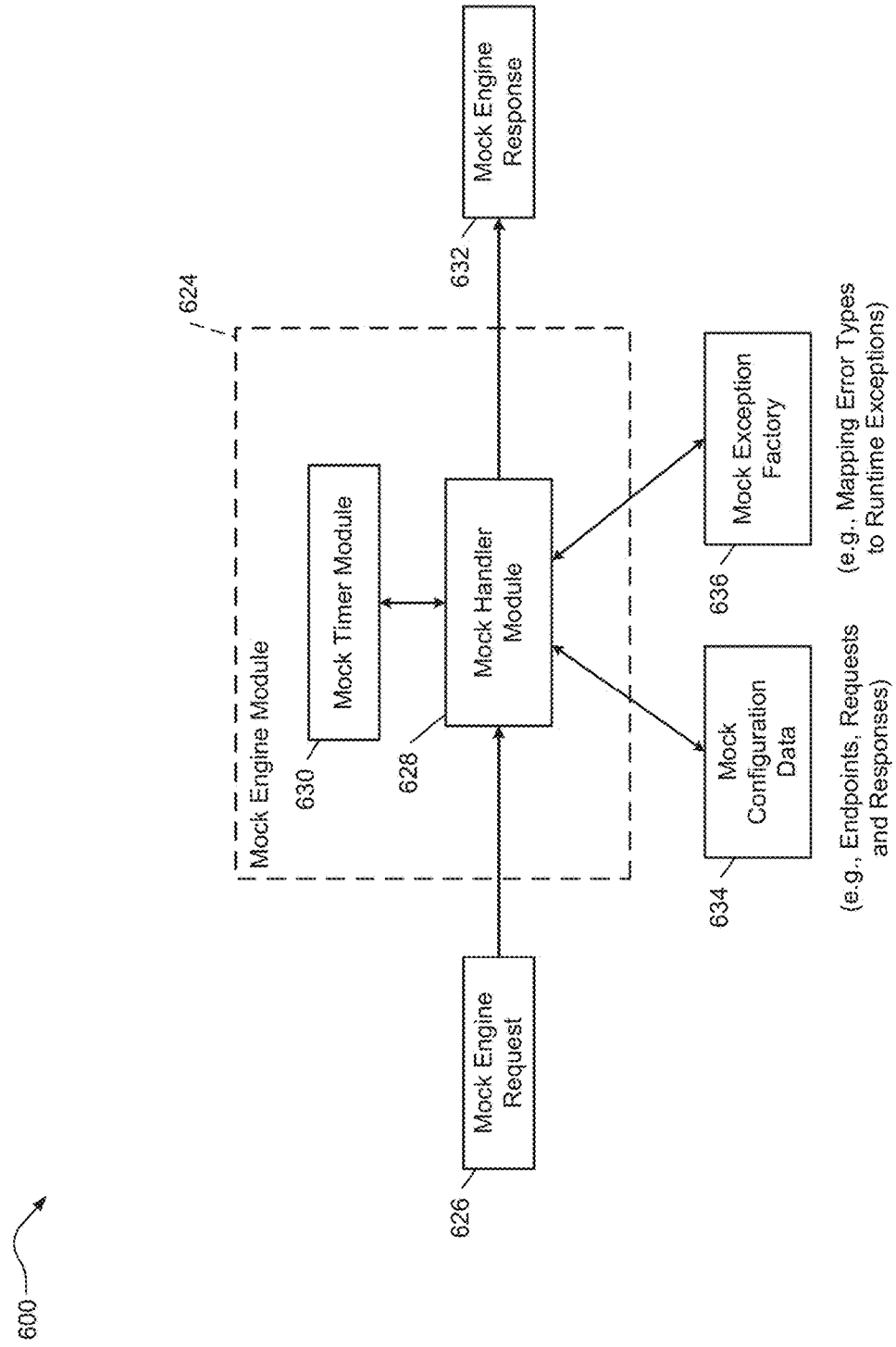
FIG. 6 is a functional block diagram illustrating an example mock engine module of the system of FIG. 4.

FIG. 6 is a functional block diagram illustrating an example arrangement 600 for a mock engine module 624. The mock engine module 624 may control service simulation behavior based on configuration and matching logics. In various implementations, the mock engine module 624 may be totally data driven. For example, the mock configuration data 634 may specify all end points that may be accessed in a UI implementation. The mock configuration data 634 may define the behavior of the mock engine module 624 for various mock engine requests 626.

For example, the mock handler module 628 may implement a matching algorithm based on the mock configuration data 634, where a mock response that best matches parameters of the mock engine request 626 is selected from the mock configuration data 634 by the mock handler module 628, and output as the mock engine response 632.

In addition, the mock engine module 624 may process delays and handle exceptions. For example, the mock timer module 630 may be used to provide a specified delay between the time a mock engine request 626 is received, and the time a response is output as the mock engine response 632. If a mock engine request 626 is associated with an exception, the mock handler module 628 may access the mock exception factory 636 to map an error type to a runtime exception.

Referring again to the mock configuration data 634, each mock configuration may drive mocking behavior performed by the mock engine module 624. For example, each mock configuration may include an endpoint associated with a particular location of a UI flow, and one or more request parameters that specify which fields and values of an input request should be matched to determine that the input request corresponds to the mock configuration.

Each mock configuration may also define a response to be generated if the mock configuration is considered to be a match for the input request. In various implementations, the mock configuration may define a data structure of the response (e.g., such as inline or in a file), any delay associated with the input request, any exception associated with the input request, etc. Example pseudocode for implementing a mock configuration is provided below:

```
Mock Config contains endpoints and request/response pairs:
{
    "endpoint": [
        {
            "request": { ... },
            "response": { ... }
        },
    ]
}
Mock Request data example:
"request": {
    "userId": "mockuser",
    "password": "login"
}
```

-continued

```
Mock Response data structure and sample values:
   "response": {
      "json": "{ \"profileId:\": \"12345\" }"
      "jsonFile": "login-mockuser.json"
      "delay": 1000,
      "mockstate": "changestate",
      "error": {
         "type": "InvalidCredentials",
         "errorCode": "1001"
      }
   }
}
```

Request Matching Process

In various implementations, a mock engine may use a matching algorithm to compare an input request against multiple configured mock requests in the mock configurations. For example, the mock engine may use a best matching algorithm to compare field and value pairs from the input request against the multiple configured mock requests in the mock configurations.

In some cases, only field/value pairs that are specified in a configured request may need to be matched. Other field/values pairs may be treated as wildcards. All field/value pairs in an input request may be compared with each configured mock request, and the configured mock request having the highest number of matched fields with the input request, or the closest degree of matched fields, may be considered as the best match. Below is an example of mock configuration data for performing request matching on field1 and field2:

```
InputRequest
{
   "field1" : "value1"
   "field2" : "value2"
   "field3" : "value2"
}
// find best matched MockRequest against InputRequest
Mock Configurations
{
   "endPoint" : [
      {
         "request" : { // MockRequest
            "field1" : "value1"
            "field2" : "value2"
         }
         "response" : { ... }
      }
   ]
}
```

Figure 7A:
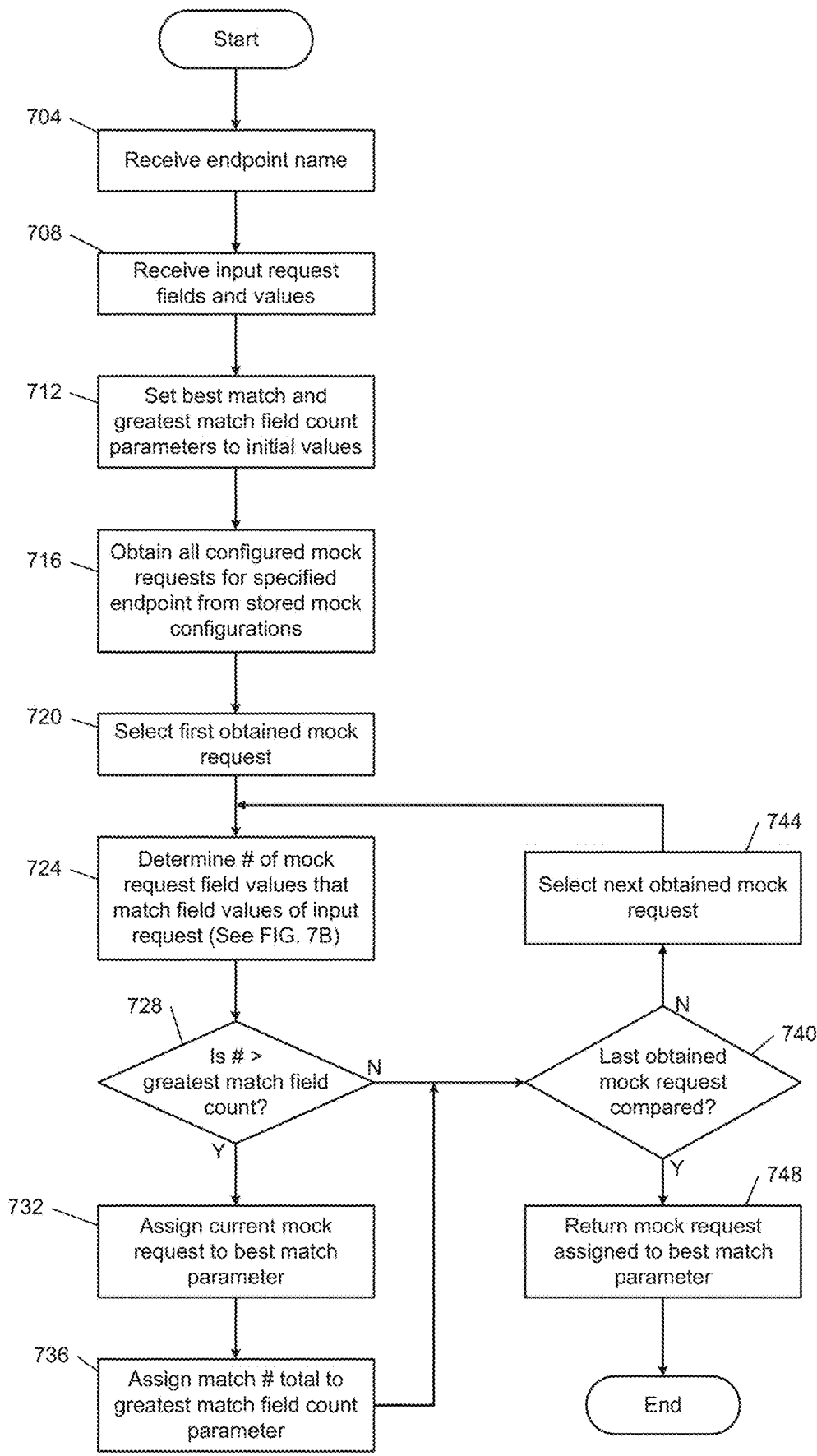
FIG. 7A is a flowchart depicting an example process for matching an input request with a mock request using a mock engine.

FIG. 7A is a flowchart depicting an example process for matching an input request with a mock request using a mock engine, which may be performed by, for example, the mock engine module 424 of the system controller 408. Control begins at 704 by receiving an endpoint name. The endpoint name may refer to a specific location within a UI flow.

At 708, control receives input request fields and values. For example, the input request may correspond to a specific action with respect to input to a UI. At 712, control sets best match and greatest match field count parameters to initial parameters (e.g., where the greatest match field count is zero and the best match mock request is null).

Control then obtains all configured mock requests for the specified endpoint from the stored mock configurations, at 716. For example, control may obtain multiple mock requests from the mock engine data 412 based on, e.g., the endpoint name received at 704. In various implementations, each mock configuration may be associated with an endpoint of a user interface, and when control receives an endpoint name it may select all mock configurations corresponding to that endpoint name.

Figure 7B:
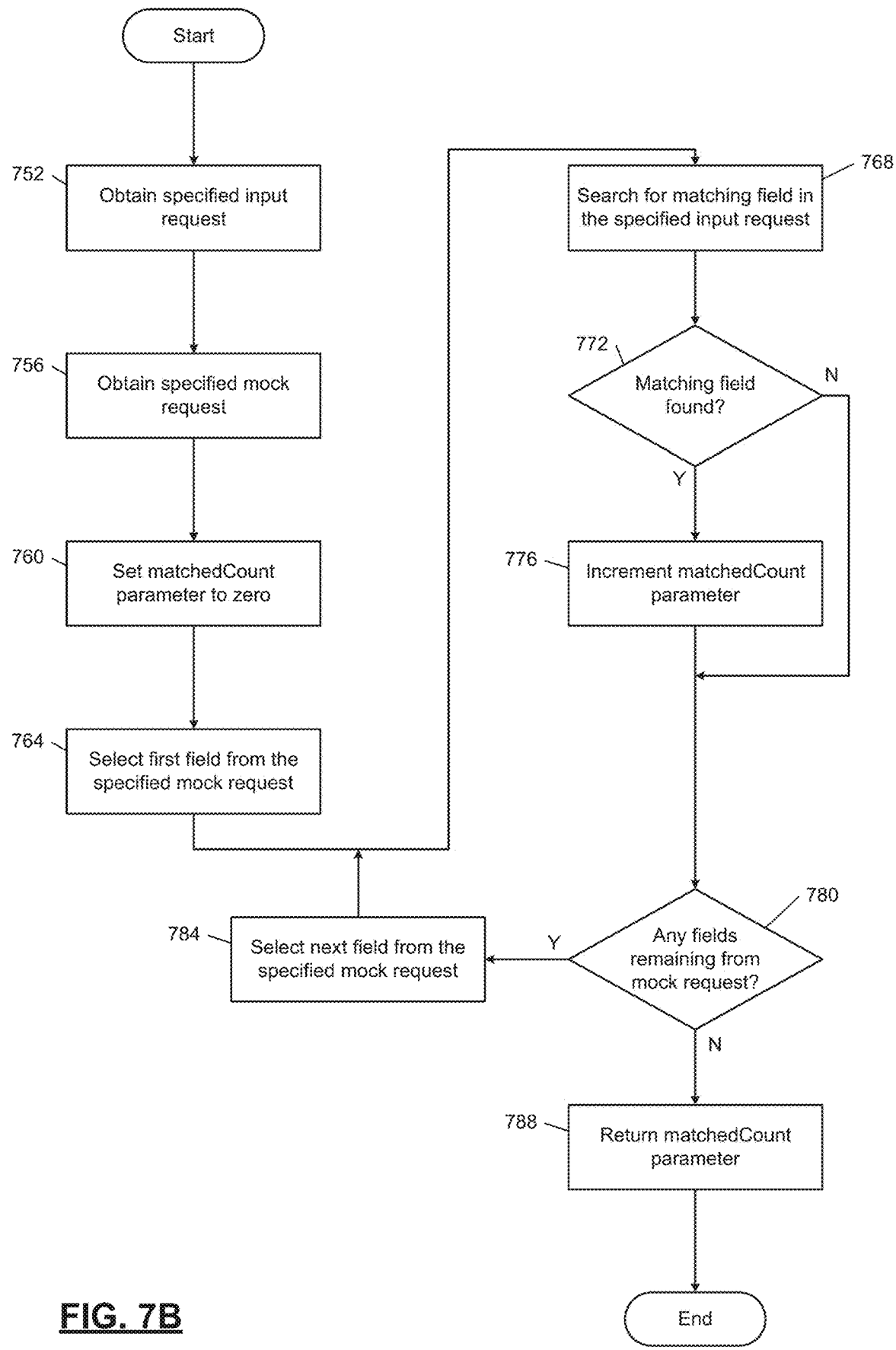
FIG. 7B is a flowchart depicting an example process for generating a match value when comparing an input request to a mock request during the process of FIG. 7A.

At 720, control selects a first one of the obtained mock requests. Control then determines a number of mock field request values that match field values of the input request at 724. An example of matching input request field values to mock request field values is illustrated in FIG. 7B, and described further below.

At 728, control determines whether the number of matching field values for the selected mock request is greater than a greatest matched field count value. For example, if the previous best matching mock request had two matching field values, and the current mock request has three matching field values, control may determine that the current mock request is now the best matching mock request with respect to the input request.

If control determines at 728 that the number of matching field values is greater than the greatest match field count value, control assigns the current mock request to the best mock request parameter at 732. For example, if control determines that Mock Request C has more matching fields than the previously best matching Mock Request A, control may update the best match parameter to indicate that Mock Request C is now the best matching mock request with respect to the input request. At 736, control assigns the number of matched fields to the greatest field count parameter.

If control determines at 728 that the number of matched fields between the input request and the currently selected mock request is not greater than the greatest match field count parameter, or after assigning the match number total to the greatest match field count parameter, control proceeds to 740 to determine whether the last obtained mock request has been compared to the input request.

If there are more mock requests awaiting comparison, control proceeds to 744 to select a next mock request, and then returns to 724 to determine whether the number of field values in the next selected mock request that match the input request field values is greater than the greatest match field count. Otherwise, control proceeds to 748 to return the mock request assigned to the best match parameter. For example, once all mock requests have been compared to the input request, control may determine which of the mock requests has a highest degree of matching with the input request (e.g., based on which mock request matches the most fields of the input request).

FIG. 7B is a flowchart depicting an example process for generating a match value when comparing an input request to a mock request during the process of FIG. 7A. At 752, control begins by obtaining a specified input request. Control then obtains a specified mock request at 756. For example, the specified input request and specified mock request may be supplied as inputs to a request matching algorithm.

At 760, control sets a matchedCount parameter to zero. Control then selects a first field from the specified mock request at 764. Control searches for a matching field in the specified input request at 768. For example, control may identify a first field in the specified mock request and check whether the field exists in the input request as well. Control may determine whether a value of the field in the mock request is the same as a value of the field in the input request.

Control determines whether a matching field was found at 772. If so, control increments the matchedCount parameter. If control determines that the selected field from the specified mock request does not have a matching field in the input request, or after incrementing the matchedCount parameter, control proceeds to 780 to determine whether any fields are remaining in the mock request for comparison against the input request. If control determines that the input request does not have a field value that matches any of the fields of the mock request, the matching algorithm may return immediately with the matchedCount parameter set to zero. If the mock request failed to match with the input request, the mock request may be skipped.

If another field remains in the mock request which has not been compared against the input request, control proceeds to select the next field from the specified mock request at 784, and returns to 768 to search for a matching field in the specified input request. If control determines at 780 that all fields in the mock request have been compared to the input request fields, control proceeds to 788 to return a matchedCount parameter. For example, control may indicate to another algorithm how many fields match between the input request and the mock request. In various implementations, the input request may include many more fields than the mock requests, such that comparing fields from the mock request to the input request to search for matches may be more efficient.

Session and State Awareness

In various implementations, a dynamic mock engine may use session awareness for service simulation. A session identifier may be included in an input request in order to generate session specific responses. For example, if a login credential in an input request from a UI includes a parameter userId=mockuser, the mock engine may return another parameter sessionId=mockUserSessId. The parameter sessionId=mockUserSessId may then be carried as input to subsequent input request calls and can be used for matching with session specific mock requests (e.g., an input request call that includes the session identifier mockUserSessId may provide a different response than an input request call that does not include the session identifier mockUserSessId, or a different response than an input request which includes a different session identifier value). Example mock configuration data for session awareness is presented below:

```
Mock configurations to use session Id:
"login" : [
   {
      "request": { "userId": "mockuser" }
      "response": { "json": "{ \"sessionId:\": \"mockUserSessId\" }"
   }
]
"profile" : [
   {
      "request": { "sessionId": "mockUserSessId" }
      "response": { ... }
   }
]
```

Figure 8:
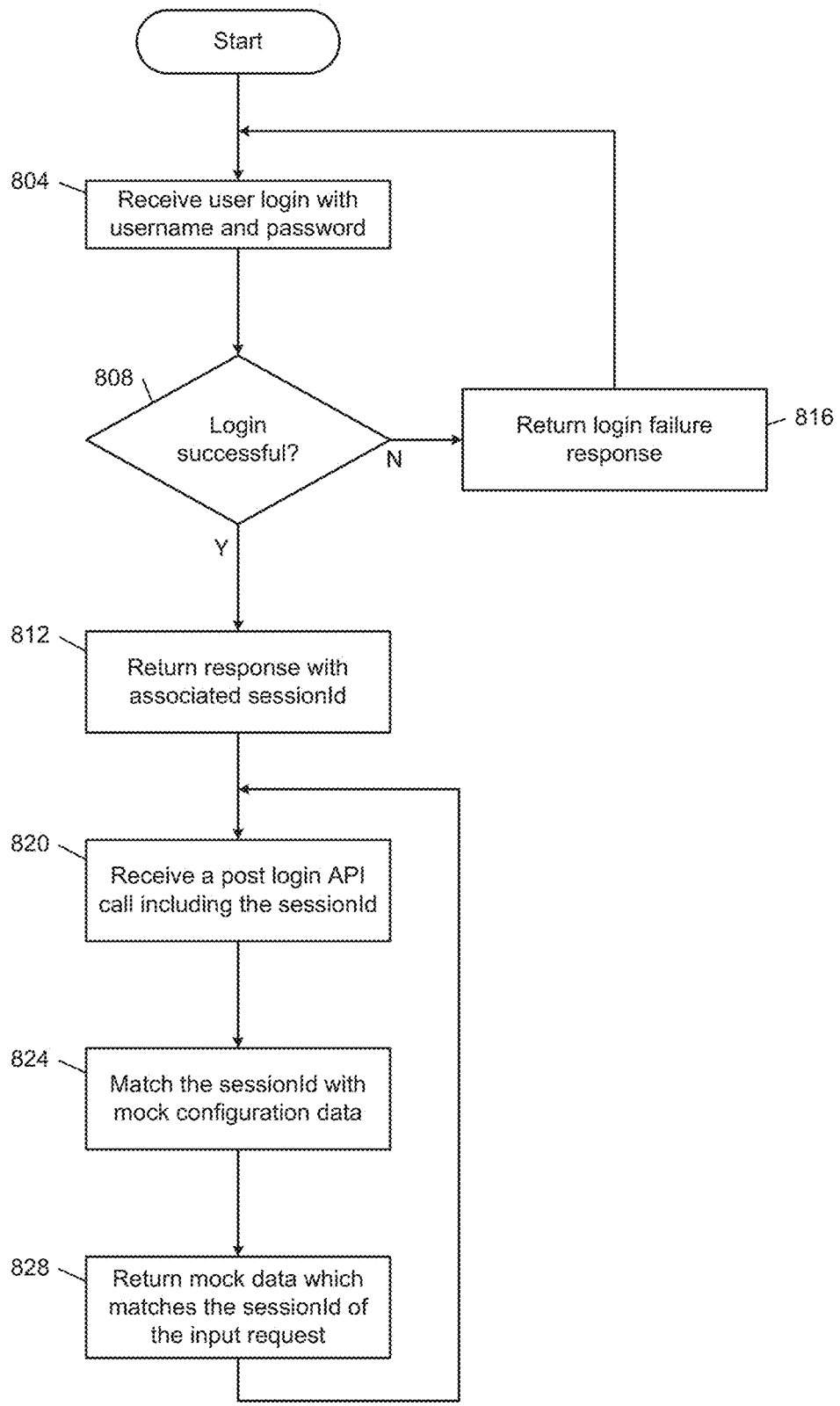
FIG. 8 is a flowchart depicting an example process for maintaining a session awareness parameter during mock service simulation using a mock engine.

FIG. 8 is a flowchart depicting an example process for maintaining a session awareness parameter during mock service simulation using a mock engine. Control begins at 804 by receiving a user login with a username and password. For example, the user login may include an input request from a UI.

At 808, control optionally determines whether a login was successful. For example, control may determine if the user login includes a valid login credential. If not, control returns a login failure at 816, and then proceeds to 804 to receive another user login.

If control determines at 808 that the login was successful, control proceeds to 812 to return a response that includes a sessionId (which may be associated with the username of the login). In various implementations, control may treat every login as successful without making a determination at 808, instead proceeding directly to 812 after receiving the user login.

At 820, control receives a post login API call which includes the sessionId (e.g., the sessionId that was returned at 812 may be provided as part of an input request of the API call). Control then matches the sessionId with mock configuration data at 824 (such as the mock engine data 412 of FIG. 4). For example, one or more stored mock configurations may be associated with the specific sessionId value.

Control returns mock data which matches the sessionId of the input request, at 828. For example, after determining a matching mock configuration based on the sessionId, control may return a response specified by the matching mock configuration. Control may then return to 820 to receive another API call including the sessionId.

Figure 9:
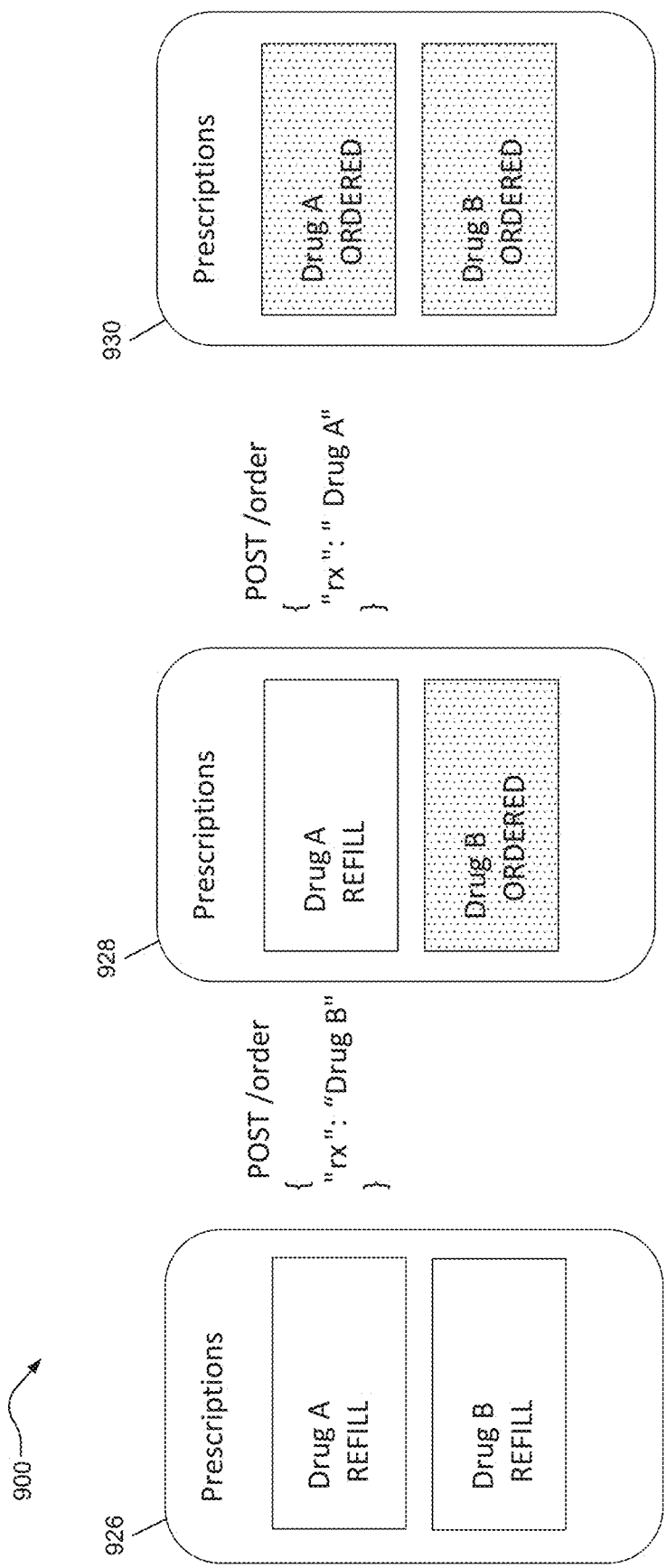
FIG. 9 is a diagram depicting an example stateful mock behavior using a mock engine.

FIG. 9 is a diagram depicting an example stateful mock behavior 900 using a mock engine. In various implementations, a mock engine may be configured to process states, such as by using cookies. Transactions may alter the state of data with respect to the mock engine, such as a refill order status for various prescriptions. In various implementations, the mock engine may use a cookie element (e.g., a "mockstate" parameter), in order to identify a current state In the example of FIG. 9, a UI screen displays a first state 926 where two prescriptions, Drug A and Drug B, are both shown as needing a refill. If the mock engine receives an input request specifying that Drug B should be ordered, or has been ordered, control proceeds to display the second state 928. The second state 928 indicates that Drug B has been ordered, while Drug A still needs a refill. The input request may be considered as an order transaction that affects prescriptions available for refill.

If the mock engine request receives an input request indicating that Drug A should be ordered, or already has been ordered, control proceeds to display a third state 930 indicating that both Drug A and Drug B have been ordered. As mentioned above, control may use cookies to track the state awareness of the drug orders. For example, after receiving the Drug B order, a state parameter may be assigned or set to indicate that Drug B has been ordered. Therefore, the next input request may generate a response to display the second state indicating that Drug B has been ordered.

Figure 10:
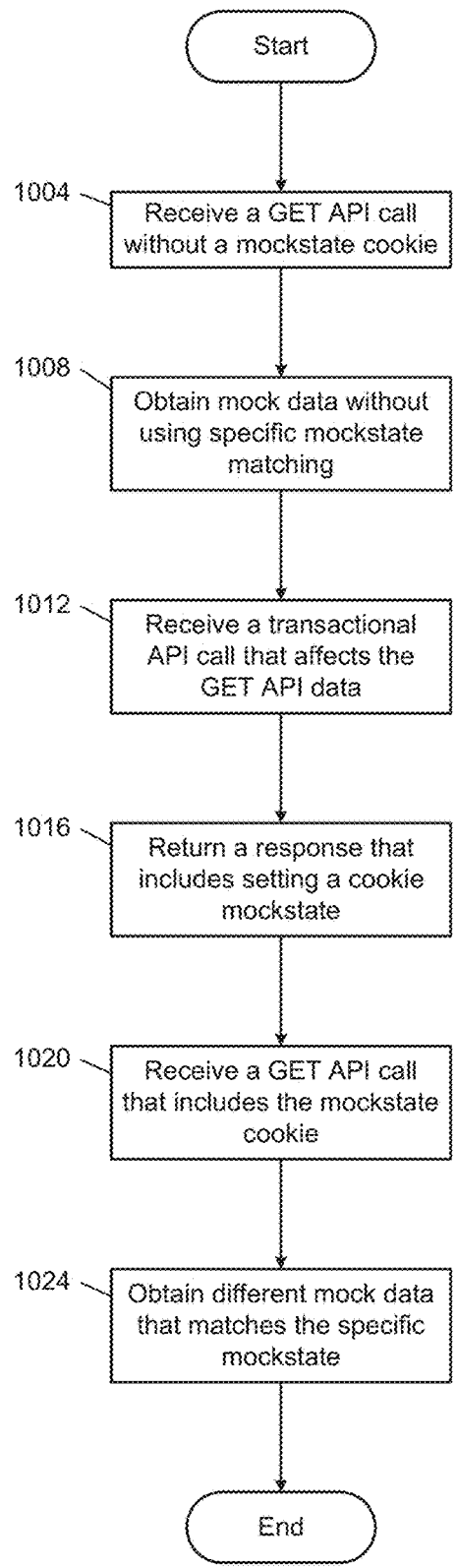
FIG. 10 is a flowchart depicting an example process for maintaining a state awareness parameter during mock service simulation using a mock engine.

FIG. 10 is a flowchart depicting an example process for maintaining a state awareness parameter during mock service simulation using a mock engine. Control begins at 1004 by receiving a GET API call, without a mockstate cookie (e.g., the GET API call may not include any mockstate cookie, or the system may not have a stored mockstate cookie value yet).

Control then obtains mock data without using specific mockstate matching, at 1008. For example, control may access the mock engine data 412 of FIG. 4 to identify a mock configuration corresponding to the input request of the GET API call, without matching any mockstate cookie value. Control may then return the obtained mock data.

At 1012, control receives a transactional API call that affects the GET API data. Control then returns a response that includes setting a cookie mockstate. For example, if control receives a transactional API call, control may set a value of a mockstate cookie, or create a new mockstate cookie, to implement state awareness based on the transactional API call.

Control then receives a GET API call at 1020, which includes the mockstate cookie. For example, the GET API call at 1020 may be different than the GET API call of 1004 because it includes the mockstate cookie, or the GET API call at 1020 may be received after a mockstate cookie value has already been created, set or stored.

Control then obtains different mock data at 1024 which matches the specific mockstate data. For example, if control matched a first mock configuration at 1008 that did not correspond to a specific state, control may match a different mock configuration at 1024 based on another state specified by the mockstate cookie value.

As an example case, stateful behavior may be used to track a balance parameter value before and after payment is received. For example, after a payment of $60 is received, a call to a function getBalance may change its response value from $100 down to $40 based on the state awareness. Example pseudocode for implementing a state awareness example is provided below. At Step 1, an API call is made to get the initial balance of $100:

```
Mock behavior:
getBalance API call:
request:
Cookie:
    sessionId: mockUserSessId,
response:
{
  balance: $100.00
}
Associated Mock data that controls the behavior:
getBalance: {
    request: {
       sessionId: mockUserSessId }
    response: {
       json: {balance: 100.00}
    }
}
```

At Step 2, an API call is made to post a $60 payment:

```
Mock behavior:
payBalance API call:
request:
Cookie:
    sessionId: mockUserSessId
Data {
    amount: $60.00
}
response:
Httpstatus: 200
Set-cookie: mockstate=post$60payment
Associated Mock data that controls the behavior:
pay Balance: {
    request: {
       sessionId: mockUserSessId ,
       amount: 60.00 }
    response: {
       mockstate: afterpaid60
    }
}
```

At Step 3, an API call is made to get the balance after making the $60 payment, where $40 now remains:

```
Mock behavior:
getBalance API call:
request:
Cookie:
    sessionId: mockUserSessId,
    mockstate=afterpaid60
response:
{
  balance: $40.00
}
Associated Mock data that controls the behavior:
getBalance: {
    request: {
       sessionId: mockUserSessId ,
       mockstate= afterpaid60
    }
    response: {
       json: {balance: 40.00}
    }
}
```

In various implementations, a dynamic mock engine may be configured to handle one or more exceptions. A mock service solution may simulate exceptions throwing behavior also. For example, an exception may be defined in mock configuration response data.

In some cases, a mapping between an exception type and a RuntimeException type may be defined via mock ExceptionFactory implementation, so that the mock engine can throw customized exception based on configuration. Example pseudocode for handling exceptions via the mock engine is produced below:

```
//Mock configurations to support Exception handling
"getBalance" : [
    {
       "request": { "userId": "userWith ServerError" }
       "response": { "error": {"type": "ServerError", "data": ". . ." }
    }
// error node is mapped to MockError object
@Profile("mock")
public class MockError extends MockResponse {
    private String errorType;
    @Singular("metadata")
    private Map<String, String> metadata;
}
// Mock Engine will parse the error node in mock configuration response
to a MockError object, and throw an exception based on exception factory
if (response instanceof MockError) {
    throw exceptionFactory.from((MockError) response);
}
// ExceptionFactory definition
@Profile({"mock"})
public interface ExceptionFactory {
    RuntimeException from(MockError var1);
}
// example implementation
@Profile("mock")
public class MockExceptionFactory implements ExceptionFactory {
    private static final Map<String, RuntimeException> exceptionMap =
((Supplier<Map<String, RuntimeException>>) ( ) -> {
       Map<String, RuntimeException> map = new HashMap<>( );
       map.put("ServerError", new ServerErrorException("ServerError",
Response. Status.INTERNAL_SERVER_ERROR));
       return Collections.unmodifiableMap(map);
    }).get( );
@Override
    public RuntimeException from(MockError mockError) {
       return exceptionMap.get(mockError.getErrorType( ));
    }
}
```

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
   memory hardware configured to store computer-executable instructions, a system endpoint module configured to access system data sources, a dynamic mock engine module for service simulation in a user interface application development system, and multiple mock configurations, wherein each mock configuration corresponds to a user interface endpoint and defines one or more fields of a mock request and an output response; and
   processor hardware configured to execute the instructions, wherein the instructions include:
   receiving an endpoint name associated with an endpoint of a user interface;
   receiving an input request having one or more fields and one or more values associated with each field;
   selecting at least one of the mock configurations that corresponds to the endpoint of the user interface associated with the received endpoint name;
   for each of the selected mock configurations corresponding to the endpoint:
   comparing fields of the mock request of the selected mock configuration to fields of the received input request; and
   determining a number of field values in the mock request of the selected mock configuration that match a field value of the input request;
   determining which one of the selected mock configurations has a greatest match with the received input request according to the number of matching field values for each mock configuration;
   accessing the output response of the mock configuration having the greatest match with the received input request; and
   transmitting the output response to at least one computing device of the user interface application development system, wherein,
   the system endpoint module and the dynamic mock engine module use a same definition of an application programming interface (API) layer,
   the system endpoint module and the dynamic mock engine module use different profiles for different implementations of a service layer, and
   a same representational state transfer (REST) API controller is used with the system endpoint module and the dynamic mock engine module, to implement a common controller API layer as the same API layer for both the system endpoint module and the dynamic mock engine module.

2. The system of claim 1, wherein determining a number of field values in the mock request that match a field value of the input request includes:
   setting a match count parameter to zero;
   for each field value in the mock request:
   searching for a field value in the received input request that matches the field value of the mock request; and
   in response to identifying a matching field value in the received input request, incrementing the match count parameter; and
   assigning a value of the match count parameter as the determined number of matching field values for the mock request.

3. The system of claim 1, wherein the instructions further include:
   determining whether the received input request includes a session identifier; and
   in response to the received input request including a session identifier:
   obtaining at least one response value associated with the session identifier; and
   including the at least one response value in the output response transmitted to the at least one computing device.

4. The system of claim 1, wherein the instructions further include:
   determining whether the received input request includes a current state identifier;
   in response to the received input request including a current state identifier:
   identifying a current mock state value according to the current state identifier;
   determining a next mock value based on the current mock state value and the received input request; and
   assigning the next mock state value to a cookie element associated with the received input request.

5. The system of claim 4, wherein the instructions further include, in response to receiving a transactional API call, storing a mockstate cookie value as the current state identifier.

6. The system of claim 1, wherein the dynamic mock engine module includes a mock exception factory that stores a mapping between exception types and runtime exceptions, and the instructions further include:
receiving an exception identifier associated with the received input request;
determining a runtime exception according to the exception identifier and the mapping stored by the mock exception factory; and
throwing a customized exception according to the determined runtime exception.

7. The system of claim 1, wherein the mock configuration having the greatest match with the received input request includes a specified delay period, and transmitting the output response includes transmitting the output response only after the specified delay period has expired.

8. The system of claim 1, wherein receiving the input request includes receiving the input request via the representational state transfer (REST) application programming interface (API) controller.

9. The system of claim 8, wherein the instructions further include receiving an API specification associated with another non-mock service, and assigning the received API specification for use by the dynamic mock engine module such that the dynamic mock engine module uses the same API specification as the other non-mock service.

10. The system of claim 9, wherein the instructions include receiving a development profile associated with another non-mock service, and assigning a different development profile for use by the dynamic mock engine module such that the dynamic mock engine module and the other non-mock service use different development profiles having different uniform resource locator (URL) addresses.

11. A computerized method for service simulation using a dynamic mock engine, the method comprising:
receiving an endpoint name associated with an endpoint of a user interface, wherein a system endpoint module is configured to access system data sources, and a dynamic mock engine module is configured for service simulation in a user interface application development system;
receiving an input request having one or more fields and one or more values associated with each field;
selecting at least one of multiple mock configurations that corresponds to the endpoint of the user interface associated with the received endpoint name, wherein each mock configuration corresponds to a user interface endpoint and defines one or more fields of a mock request and an output response;
for each of the selected mock configurations corresponding to the endpoint:
comparing fields of the mock request of the selected mock configuration to fields of the received input request; and
determining a number of field values in the mock request of the selected mock configuration that match a field value of the input request;
determining which one of the selected mock configurations has a greatest match with the received input request according to the number of matching field values for each mock configuration;
accessing the output response of the mock configuration having the greatest match with the received input request; and
transmitting the output response to at least one computing device of a user interface application development system, wherein,
the system endpoint module and the dynamic mock engine module use a same definition of an application programming interface (API) layer,
the system endpoint module and the dynamic mock engine module use different profiles for different implementations of a service layer, and
a same representational state transfer (REST) API controller is used with the system endpoint module and the dynamic mock engine module, to implement a common controller API layer as the same API layer for both the system endpoint module and the dynamic mock engine module.

12. The method of claim 11, wherein determining a number of field values in the mock request that match a field value of the input request includes:
setting a match count parameter to zero;
for each field value in the mock request:
searching for a field value in the received input request that matches the field value of the mock request; and
in response to identifying a matching field value in the received input request, incrementing the match count parameter; and
assigning a value of the match count parameter as the determined number of matching field values for the mock request.

13. The method of claim 11, further comprising:
determining whether the received input request includes a session identifier; and
in response to the received input request including a session identifier:
obtaining at least one response value associated with the session identifier; and
including the at least one response value in the output response transmitted to the at least one computing device.

14. The method of claim 11, further comprising:
determining whether the received input request includes a current state identifier;
in response to the received input request including a current state identifier:
identifying a current mock state value according to the current state identifier;
determining a next mock value based on the current mock state value and the received input request; and
assigning the next mock state value to a cookie element associated with the received input request.

15. The method of claim 14, further comprising, in response to receiving a transactional API call, storing a mockstate cookie value as the current state identifier.

16. The method of claim 11, further comprising:
storing, by a mock exception factory, a mapping between exception types and runtime exceptions;
receiving an exception identifier associated with the received input request;
determining a runtime exception according to the exception identifier and the mapping stored by the mock exception factory; and
throwing a customized exception according to the determined runtime exception.

17. The method of claim 11, wherein the mock configuration having the greatest match with the received input request includes a specified delay period, and transmitting the output response includes transmitting the output response only after the specified delay period has expired.

18. The method of claim 11, wherein receiving the input request includes receiving the input request via the representational state transfer (REST) application programming interface (API) controller.

19. The method of claim 18, further comprising receiving an API specification associated with another non-mock service, and assigning the received API specification for use by a dynamic mock engine module such that the dynamic mock engine module uses the same API specification as the other non-mock service.

20. The method of claim 19, further comprising receiving a development profile associated with another non-mock service, and assigning a different development profile for use by the dynamic mock engine module such that the dynamic mock engine module and the other non-mock service use different development profiles having different uniform resource locator (URL) addresses.

* * * * *